United States Patent [19]

Gellatly

[11] 4,065,085
[45] Dec. 27, 1977

[54] FIRE PIT HANGER

[76] Inventor: Walter L. Gellatly, 350-35th St., Ogden, Utah 84403

[21] Appl. No.: 728,310

[22] Filed: Sept. 30, 1976

[51] Int. Cl.² .......................... A47J 37/00; F24B 3/00
[52] U.S. Cl. ..................... 248/124; 126/30; 248/156
[58] Field of Search .............. 248/124, 125, 156, 145, 248/285, 341; 126/137, 25 A, 25 AA, 29, 26, 30

[56] References Cited

U.S. PATENT DOCUMENTS

| 630,317 | 8/1899 | Berg | 248/124 X |
|---|---|---|---|
| 699,066 | 4/1902 | Baskett | 248/156 X |
| 755,995 | 3/1904 | Brown | 126/30 UX |
| 1,414,771 | 5/1922 | Cantleberry | 126/30 UX |
| 1,645,768 | 10/1927 | Morten | 248/145 |
| 1,666,293 | 4/1928 | Lorton | 248/124 UX |
| 1,875,235 | 8/1932 | Grube | 248/285 X |
| 3,151,595 | 10/1964 | Stainbrook | 248/124 UX |
| 3,261,344 | 7/1966 | Petrie | 126/30 |

FOREIGN PATENT DOCUMENTS

| 206,330 | 7/1939 | Switzerland | 126/30 |

*Primary Examiner*—J. Franklin Foss
*Attorney, Agent, or Firm*—B. Deon Criddle

[57] ABSTRACT

A pit fire hanger that is removably or permanently mounted adjacent to a barbecue pit so that vessels for food and food items can be suspended over an open fire for cooking purposes. A support arm is vertically adjustable on a support post and swivel hooks are adjustably positioned on the support arm to carry food or food vessels. One of the swivel hooks is also used to positively lock the arm in position on the post.

3 Claims, 3 Drawing Figures

U.S. Patent  Dec. 27, 1977  4,065,085
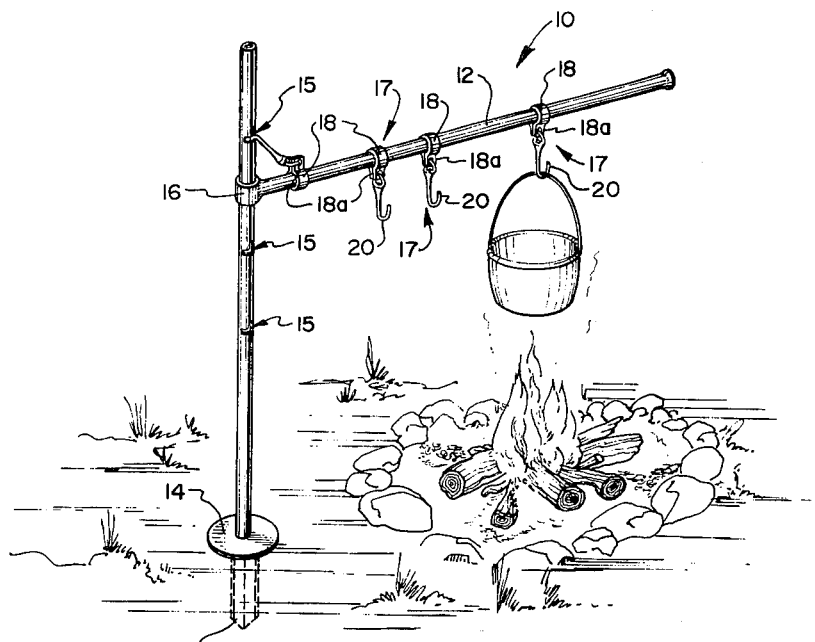
FIG. 1
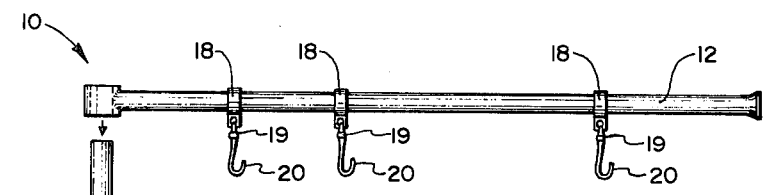
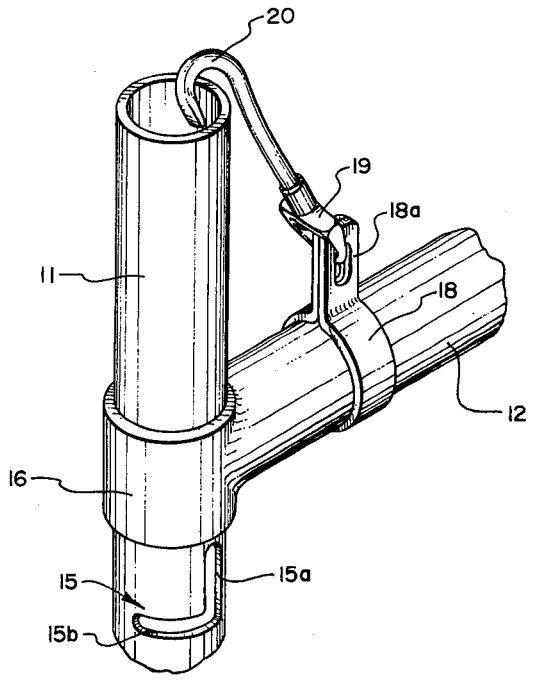
FIG. 2  FIG. 3

FIRE PIT HANGER

BRIEF DESCRIPTION OF THE INVENTION

1. Field of the Invention

This invention relates to devices for suspending food or vessels for food above a barbecue pit.

2. Prior Art

A great many devices have been used by men to hang food and food vessels over an open cooking fire and these range from crude wooden tripods to sophisticated platform structures. However, so far as I am aware there has not heretofore been such a device that comprises a minimum of parts, that is extremely sturdy, that allows for infinite vertical adjustment of supported food above the fire while also allowing for positive locking of the support arm at selected elevations and that will allow the supported food to be pivoted over the fire for cooking and outwardly thereof for easy food handling.

SUMMARY OF THE INVENTION

Principal objects of the present invention are to provide a means for supporting food and food vessels over an open fire, but such that they can be rotated clear of the fire for handling and the like.

Other objects are to provide such a support means that is economical to construct, that can be portable, that has a minimum number of components, that includes means for infinitely adjusting the height of the food or vessel over the fire, and that provides for positive positioning of even heavy loads, at selected heights, when desired.

Principal features of the invention include a support post with an angled tip and a base plate at one end thereof and with hook receiving openings spaced therealong. A tubular connector is closely telescoped over the support post and a support arm extends from the tubular connector. Hooks are swivel connected to collars on the support arm and the hook nearest to the support post is adapted to fit into the hook receiving openings to positively latch the support arm in a selected position on the support post. All of the hook receiving openings allow the support arm to swing far enough to allow food or food vessels to be moved clear of a fire over which the arm may be extended.

Additional objects and features of the invention will become apparent from the following detailed description, taken together with the accompanying drawing, showing a presently preferred embodiment of the invention.

THE DRAWING

In the Drawing:

FIG. 1 is a perspective view of the pit fire hanger of the invention, shown supporting a cooking pot over an open fire;

FIG. 2, an exploded side elevation view, with the support arm separated from the support post, for clarity; and FIG. 3, an enlarged fragmentary perspective view of the support post, with the support arm positively locked against axial travel thereon.

DETAILED DESCRIPTION

Referring now to the drawings:

In the illustrated preferred embodiment, the pit fire hanger of the invention, shown generally at 10, includes a tubular support post 11 and a support arm 12.

The support post 11 has a spike 13, which preferably is formed from angle iron with a pointed end formed thereon, affixed to one end thereof. A plate 14 encircles the support post 11 and extends as a collar outwardly therefrom so that when the spike is inserted in the ground the plate 14 will stabilize the upstanding support post. A plurality of L-shaped holes 15 are preferably formed along the length of the support post, for a purpose to be hereinafter described in detail.

The support arm 12 has a sleeve 16 on one end thereof and the sleeve is adapted to closely encircle the support post and to slide therealong. As will be apparent, the weight of support arm 12, and any load carried thereby, will normally cause the sleeve 16 to bind against sliding on the support post when the support post is upright. When the arm is raised to relieve the weight the sleeve can be moved to any desired position along the length of the post. Thereafter, when the sleeve is dropped the weight of the arm will again cause the sleeve 16 to bind on the support post 11 and the arm to be held against further axial movement along the support post.

Even while the weight of the arm prevents axial movement of the arm with respect to the post, the arm can swing around the post and can move from a position extending over a fire to a position clear of the fire where foodstuffs can be easily placed on or be removed from the arm.

Support arm 12 has at least one, and preferably a plurality of hangers 17 thereon. Each hanger includes a band 18 that encircles the hanger arm and that is slidable therealong. A swivel 19 that extends through ears 18a of the band can swing with respect to the band and has a hook 20 projecting therefrom.

As shown best in FIG. 3, the band 18 of the hanger 17 nearest to the support post 11 can be turned on the support arm 12 so that the hook 20 thereof can reach into the open top of the support post. With the hook 20 so engaged, support arm 12 is positively held against downward movement on the support post, but, since the hook 20 can slide around the upper edge of the post, the arm 12 can be freely rotated and thus can be positioned over a fire and then swung free of the fire as foodstuffs are placed on or taken off the arm.

The L-shaped holes 15 each have a portion 15a that extends lengthwise of the support post, through a wall thereof and a transverse portion 15b that extends from the bottom of the portion 15a. The holes 15 are spaced along the length of the support post and the same hook 20 that can be used to reach into the top of the support post, can be inserted through a slot portion 15a, depending on the selected height desired for the support arm. The hook 20 is allowed to drop to the bottom of the portion 15a and will then move in the slot portion 15b as the arm is pivoted between a position extending over the fire for cooking and a position clear of the fire, where the arm can be easily loaded with foodstuff or can be unloaded.

With the present invention, the support post 11 can be firmly planted in the ground next to a fire pit and the arm 12 can be placed thereon. The arm is infinitely adjustable along the post to any desired height above the fire and, if necessary because of wind conditions or the like, can be positively locked at a selected height determined by the length of the post 11 or the holes 15a by inserting a hook 19 in the upper end of the post or in the holes. Regardless of the manner in which the arm is secured to the post, whether positively with a hook 20 or by binding, the arm can swing from a position extending over a fire to a position clear of the fire.

Although a preferred form of my invention has been herein disclosed, it is to be understood that the present disclosure is by way of example and that variations are possible, without departing from the scope of the hereinafter claimed subject matter, which subject matter I regard as my invention.

I claim:

1. A pit fire hanger comprising
an upright support post having an open upper end;
a collar closely fitting around and slidable on said support post;
a support arm fixed to and cantilevered outwardly from said collar;
a plurality of holes spaced along the length of the support post, each said hole having a vertical portion extending axially of the post and a transversely extending portion at a lower end of the vertical portion and extending partially around the post; and
a plurality of hangers carried by and slidable along said support arm, each said hanger including a hook adapted to be suspended from said support arm and at least one said hook being adapted to selectively engage the upper end of the support post or one of said plurality of holes to prevent movement of said collar axially along the post while allowing pivoting movement of said arm with respect to said post.

2. A pit fire hanger as in claim 1, further including a plurality of hangers carried by and slidable along the support arm, each said hanger including a hook.

3. A pit fire hanger as in claim 2, further including a point formed on the lower end of the support post; and
a collar encircling said post above the point and projecting outwardly thereof as a flange.

* * * * *